United States Patent
Borst et al.

(10) Patent No.: US 10,440,709 B1
(45) Date of Patent: Oct. 8, 2019

(54) RESOURCE ALLOCATION SCHEME FOR VEHICLE-TO-VEHICLE (V2V) COMMUNICATIONS

(71) Applicant: Nokia Technologies Oy, Espoo (FI)

(72) Inventors: Simon Borst, Maplewood, NJ (US); Jakub Mazgula, Summit, NJ (US); Harish Viswanathan, Morristown, NJ (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/997,462

(22) Filed: Jun. 4, 2018

(51) Int. Cl.
  *H04W 72/04* (2009.01)
  *H04W 4/46* (2018.01)

(52) U.S. Cl.
  CPC .......... *H04W 72/0446* (2013.01); *H04W 4/46* (2018.02)

(58) Field of Classification Search
  None
  See application file for complete search history.

(56) References Cited

U.S. PATENT DOCUMENTS

| | | | | |
|---|---|---|---|---|
| 8,520,695 | B1* | 8/2013 | Rubin | G08G 9/02 370/445 |
| 2009/0161644 | A1* | 6/2009 | Suzuki | H04W 72/10 370/341 |
| 2011/0288754 | A1* | 11/2011 | Shida | G08G 1/22 701/117 |
| 2012/0268295 | A1* | 10/2012 | Yuse | G08G 1/0104 340/905 |
| 2013/0279392 | A1* | 10/2013 | Rubin | H04W 72/005 370/312 |
| 2015/0077270 | A1* | 3/2015 | Rubin | G08G 9/02 340/903 |
| 2016/0212596 | A1* | 7/2016 | Brahmi | H04W 72/0406 |
| 2017/0352263 | A1* | 12/2017 | Umehara | G08G 1/0133 |
| 2018/0049129 | A1* | 2/2018 | Li | H04W 52/0235 |
| 2018/0279325 | A1* | 9/2018 | Huang | H04L 5/0044 |
| 2018/0316395 | A1* | 11/2018 | Sundararajan | H04W 72/10 |
| 2018/0338000 | A1* | 11/2018 | Weisman | H04L 67/12 |
| 2018/0351250 | A1* | 12/2018 | Achour | G01S 7/03 |

* cited by examiner

*Primary Examiner* — Kevin D Mew
(74) *Attorney, Agent, or Firm* — Duft & Bornsen, PC

(57) ABSTRACT

Systems, methods, and software for managing radio resources for vehicle-to-vehicle (V2V) communications. A geographic area is segmented into zones with a subset of the transmission slots allocated to each of the zones. The subset of the transmission slots allocated to each zone is partitioned into periodic transmission slots assignable to individual vehicles for periodic transmissions and special transmission slots reserved for special transmissions according to a contention-based protocol. A resource manager stores a mapping of transmission slots for each of the zones. When a vehicle enters one of the zones, the resource manager performs a slot assignment for the vehicle from the periodic transmission slots allocated to the zone, and transmits a notification to the vehicle indicating the slot assignment.

20 Claims, 7 Drawing Sheets

RESOURCE ALLOCATION SCHEME FOR VEHICLE-TO-VEHICLE (V2V) COMMUNICATIONS

TECHNICAL FIELD

This disclosure relates to the field of communication systems and, in particular, to wireless communications.

BACKGROUND

Vehicle-to-vehicle (V2V) communications refer to the wireless transmission of data between vehicles (e.g., motor vehicles). One goal of V2V communications is to prevent accidents by allowing vehicles in transit to exchange location data, speed data, etc. V2V communications will play an increasing role in enabling a wide range of automotive applications and growing levels of driving assistance and automation, ranging from alerts to help human drivers in maintaining a safe following distance, to highway platooning and fully autonomous driving capabilities. Many of these functionalities involve time-critical information exchange and coordination, and require low-latency wireless communication. At the same time, the available wireless spectrum may be scarce, and efficient utilization of the wireless spectrum remains an issue for network operators.

SUMMARY

Embodiments described herein are directed to management of radio resources for V2V communications. One goal of the management scheme is to guarantee low latency for delay-sensitive transmissions and provide high capacity without incurring excessive signaling. The management scheme, in order to improve spatial reuse efficiency, partitions a geographic area into zones, and the radio resources are divided among the zones so that transmissions in neighboring zones will not collide. The management scheme also reserves some of radio resources (also referred to as channels or transmission slots) for special transmissions, and designates other radio resources for regular or periodic transmissions. The radio resources designated for periodic transmissions are specifically assigned to individual vehicles, while the radio resources reserved for special transmissions are used by the vehicles based on a contention-based scheme. Therefore, vehicles may transmit delay-sensitive transmissions, such as alerts or emergency messages, on the reserved radio resources, and may use their individually-designated radio resources for other messages that are not as delay sensitive.

One embodiment comprises a resource manager that includes a memory and a controller. The memory is configured to store a mapping of transmission slots on a Radio Frequency (RF) spectrum for V2V communications in a geographic area. The geographic area is segmented into a plurality of zones, and a subset of the transmission slots are allocated to each of the zones. The subset of the transmission slots allocated to each of the zones is partitioned into periodic transmission slots assignable to individual vehicles for periodic transmissions, and special transmission slots reserved for special transmissions according to a contention-based protocol. The controller is configured to detect that a vehicle entered one of the zones, to perform a slot assignment for the vehicle from the periodic transmission slots allocated to the one of the zones, and to transmit a notification through a vehicle interface component to the vehicle indicating the slot assignment.

In another embodiment, the controller is configured to determine whether any of the periodic transmission slots allocated to the one of the zones are available, and to not assign a periodic transmission slot to the vehicle when none of the periodic transmission slots allocated to the one of the zones are available.

In another embodiment, when one or more of the periodic transmission slots allocated to the one of the zones is available, the controller is configured to determine whether a number of the available periodic transmission slots allocated to the one of the zones is above a threshold. When the number is above the threshold, the controller is configured to assign one of the available periodic transmission slots to the vehicle. When the number is not above the threshold, the controller is configured to assign a half slot of one of the available periodic transmission slots to the vehicle.

In another embodiment, the special transmission slots for each of the zones are spaced evenly among the periodic transmission slots.

In another embodiment, the controller is configured to release the slot assignment for the vehicle when the vehicle leaves the one of the zones.

In another embodiment, the notification indicates the special transmission slots allocated to the one of the zones.

Another embodiment comprises a method of managing radio resources for V2V communications. The method comprises storing a mapping of transmission slots on a RF spectrum for the V2V communications in a geographic area. The method further comprises detecting that a vehicle entered one of the zones, performing a slot assignment for the vehicle from the periodic transmission slots allocated to the one of the zones, and transmitting a notification to the vehicle indicating the slot assignment.

Another embodiment comprises a system that manages radio resources for V2V communications. The system includes a means for storing a mapping of transmission slots on a RF spectrum for V2V communications in a geographic area. The system includes a means for detecting that a vehicle entered one of the zones, a means for performing a slot assignment for the vehicle from the periodic transmission slots allocated to the one of the zones, and a means for transmitting a notification to the vehicle indicating the slot assignment.

Another embodiment comprises a V2V communication device installed in a vehicle. The V2V communication device comprises a radio interface component configured to exchange V2V communications with other vehicles via radio signals in a RF spectrum. The V2V communication device further comprises a radio controller configured to receive a notification through the radio interface component when the vehicle enters one of a plurality of zones within a geographic area. The geographic area is segmented into the plurality of zones, and a subset of transmission slots of the RF spectrum is allocated to each of the zones. The subset of the transmission slots allocated to each of the zones is partitioned into periodic transmission slots assignable to individual vehicles for periodic transmissions and special transmission slots reserved for special transmissions according to a contention-based protocol. The notification indicates a slot assignment for the vehicle from the periodic transmission slots allocated to the one of the zones. The radio controller is configured to identify a periodic transmission generated for a V2V communication, to determine whether a periodic transmission slot has been assigned to the vehicle in the slot assignment, and to transmit the periodic transmission on the periodic transmission slot via the radio interface component when the periodic transmission slot has been assigned to the vehicle.

In another embodiment, when the slot assignment indicates that a periodic transmission slot has not been assigned to the vehicle, the radio controller is configured to determine whether a half slot of a periodic transmission slot has been assigned to the vehicle in the slot assignment. When a half slot has been assigned to the vehicle, the radio controller is configured to transmit the periodic transmission on the half slot that was assigned to the vehicle via the radio interface component.

In another embodiment, when the slot assignment indicates that a half slot has not been assigned to the vehicle, the radio controller is configured to randomly select a half slot from the periodic transmission slots allocated to the one of the zones, and to transmit the periodic transmission on the half slot that was randomly selected via the radio interface component.

In another embodiment, the radio controller is configured to identify a special transmission generated for a V2V communication, to determine whether a periodic transmission slot has been assigned to the vehicle in the slot assignment, and to transmit the special transmission on a next special transmission slot via the radio interface component when a periodic transmission slot has not been assigned to the vehicle.

In another embodiment, when a periodic transmission slot has been assigned to the vehicle, the radio controller is configured to determine whether the periodic transmission slot is within a threshold time, to transmit the special transmission on the periodic transmission slot via the radio interface component when the periodic transmission slot is within the threshold time, and to transmit the special transmission on the next special transmission slot via the radio interface component when the periodic transmission slot is not within the threshold time.

In another embodiment, the radio controller is configured to randomly select a half slot from the next special transmission slot, and to transmit the special transmission on the half slot that was randomly selected via the radio interface component.

In another embodiment, the radio controller is configured to receive the notification through the radio interface component from a base station of a Radio Access Network (RAN).

Another embodiment comprises a method of using radio resources for V2V communications exchanged via radio signals in a RF spectrum. The method comprises receiving a notification at a V2V communication device installed in a vehicle when the vehicle enters one of a plurality of zones within a geographic area. The notification indicates a slot assignment for the vehicle from the periodic transmission slots allocated to the one of the zones. The method further comprises identifying a periodic transmission generated for a V2V communication, determining whether a periodic transmission slot has been assigned to the vehicle in the slot assignment, and transmitting the periodic transmission on the periodic transmission slot when the periodic transmission slot has been assigned to the vehicle.

Another embodiment comprises a system in a vehicle that uses radio resources for V2V communications exchanged via radio signals in a RF spectrum. The system includes a means for receiving a notification when the vehicle enters one of a plurality of zones within a geographic area. The notification indicates a slot assignment for the vehicle from the periodic transmission slots allocated to the one of the zones. The system further includes a means for identifying a periodic transmission generated for a V2V communication, a means for determining whether a periodic transmission slot has been assigned to the vehicle in the slot assignment, and a means for transmitting the periodic transmission on the periodic transmission slot when the periodic transmission slot has been assigned to the vehicle.

Other embodiments may include computer readable media, other systems, or other methods as described below.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
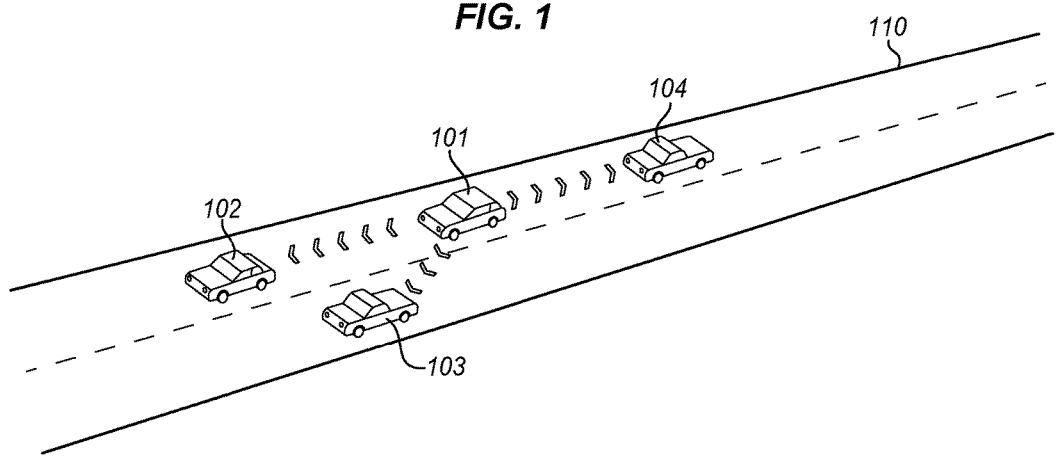
FIG. 1 illustrates V2V communications between vehicles in an illustrative embodiment.

FIG. 1 illustrates V2V communications between vehicles in an illustrative embodiment. V2V communications refers to a technology that allows vehicles 101-104 to directly communicate with one another via Radio-Frequency (RF)

signals on an RF spectrum without relying on a fixed communication infrastructure. A V2V communication therefore refers to a direct communication between vehicles over a radio or air interface. In this embodiment, there are four vehicles 101-104 traveling on a roadway 110 that are within radio range of one another. Due to their proximity, vehicle 101 may broadcast data, such as location, speed, etc., that is directly received by vehicles 102-104 without going through a cellular network. Vehicles 102-104 may also broadcast data for receipt by other vehicles in their vicinity.

As described in more detail below, vehicles 101-104 have onboard V2V communication devices that utilize wireless technologies to transmit and receive data over the airwaves. Because different technologies can use the airwaves simultaneously, the RF spectrum is segmented into frequency bands. Regulatory agencies, such as the Federal Communications Commission (FCC) in the United States, define a licensed spectrum where carriers (e.g., Verizon Wireless®, T-Mobile®, AT&T®, etc.) are allowed to operate. A regulatory agency uses spectrum allocation to issue exclusive rights to carriers to operate within certain frequency bands on the licensed spectrum. Spectrum allocation ensures that carriers do not interfere with each other's transmissions. Other frequency ranges in the RF spectrum are unlicensed, and are referred to as the "unlicensed spectrum". One example of the unlicensed spectrum is the 5 GHz band used by dual-band Wi-Fi equipment. V2V communications as described herein may use frequencies in the licensed spectrum and/or the unlicensed spectrum.

Regardless of the RF spectrum used, the RF spectrum is partitioned into radio resources that are used by individual vehicles for V2V communications. The radio resources described herein have a frame structure. A frame is divided into a number of transmission slots, and each of the transmission slots is orthogonal in the time domain or in the frequency/time domain. A V2V communication device installed at a vehicle 101-104 is configured to encode data onto a transmission slot or a subset (i.e., a half slot) of a transmission slot to send (i.e., broadcast) the data to other vehicles, and is configured to decode data from a transmission slot/half slot.

Efficient use of the RF spectrum is an issue for V2V communications, especially in dense traffic scenarios. The embodiments described herein provide a management scheme, such as a Medium Access Control (MAC) scheme, that utilizes the radio resources to provide low latency for some V2V communications while achieving efficient resource utilization and providing high capacity. As an overview of the management scheme, a vehicle may generate different types of transmissions or messages for a V2V communication. One type of transmission is a "periodic" transmission, which is a transmission that is regular, repeating, or recurring. For example, a vehicle may be programmed to transmit position and velocity data at periodic intervals to other vehicles in proximity. Periodic transmissions may have a certain delay tolerance that is acceptable. Another type of transmission is a "special" transmission, which is a transmission that is random or unplanned, and is triggered in response to certain conditions. For example, a vehicle may generate a special transmission upon detecting an emergency, detecting an obstacle, etc. A special transmission may be associated with an urgent transmission or an alert transmission that is more time-sensitive than a periodic transmission.

The frame duration (F) may be (at most) equal to the latency bound for the periodic transmissions, which in turn is assumed to be less than the average inter-arrival time of the periodic transmissions. With the frame duration (F), the number (T) of transmission slots in a frame may be determined such that a transmission slot is sufficient to transmit a periodic transmission with a given number of bytes at a given signal-to-interference-plus-noise ratio (SINR) (e.g., −3 dB). The transmission slots may be split into half slots, and a periodic transmission may be encoded on a half slot provided the SINR value is higher by a certain margin (e.g., 0 dB).

The management scheme described herein applies to a geographical area that is partitioned or segmented into zones. The transmission slots of the RF spectrum being used are divided or segmented into subsets, and a subset is allocated to each of the zones. The transmission slots are allocated among the zones so that simultaneous transmissions by vehicles 101-104 within the same zone may interfere, while transmissions by vehicles 101-104 in different zones should not interfere. Within each zone, a subset of transmission slots are partitioned into transmission slots reserved for special transmissions, and transmission slots designated for periodic transmissions.

Figure 2:
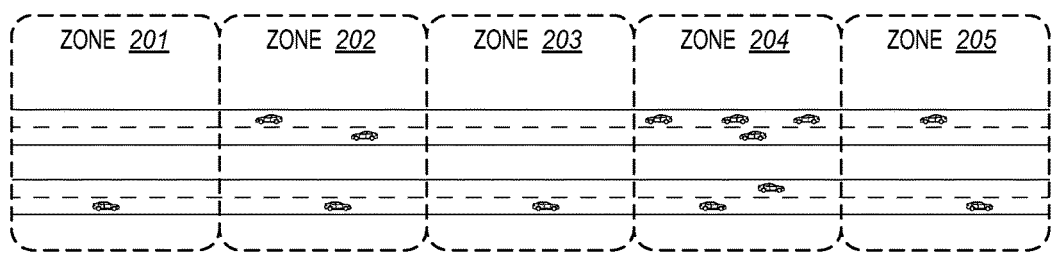
FIG. 2 illustrates a geographical area for V2V communications in an illustrative embodiment.

FIG. 2 illustrates a geographical area 200 for V2V communications in an illustrative embodiment. Geographical area 200 represents an area in which V2V communications will take place, such as along a highway, an interstate, or another type of roadway that is conducive to travel by vehicles. Geographical area 200 is divided into zones 201-205, where a zone is a stretch of land subject to particular restrictions for V2V communications. Zones 201-205 may be evenly spaced, and may each have a length (Z), such as 100 meters, 200 meters, 300 meters, etc. It may be assumed in this embodiment that zones 201-205 are aligned linearly along a roadway as shown in FIG. 2.

Figure 3:
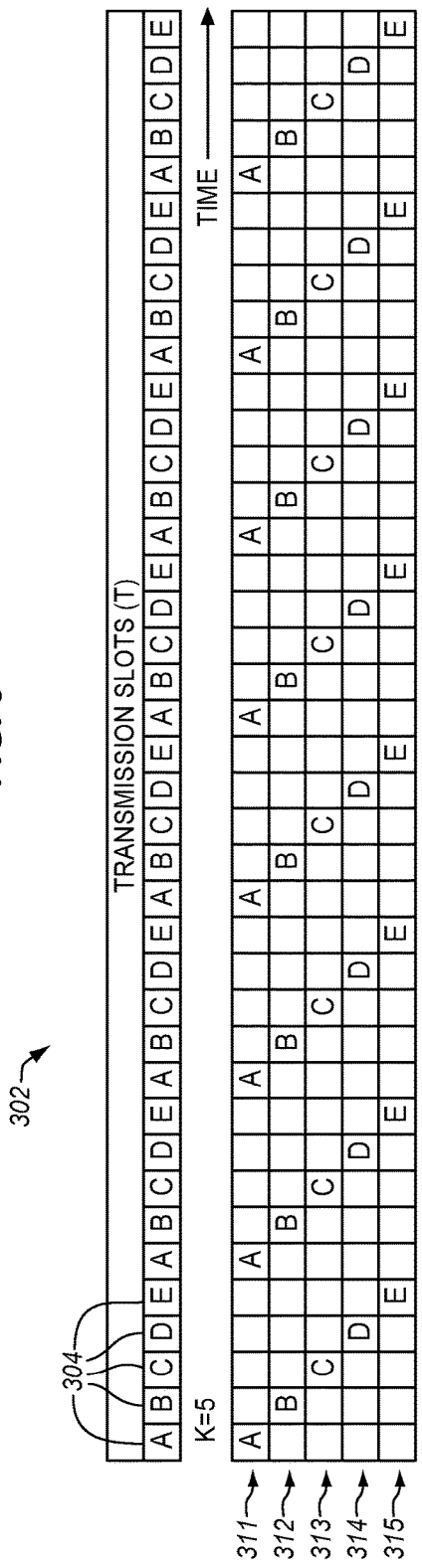
FIG. 3 illustrates a pool of transmission slots partitioned among a group of zones in an illustrative embodiment.

A pool of transmission slots from a frame or group of frames is partitioned among a group (K) of zones 201-205. FIG. 3 illustrates a pool 302 of transmission slots 304 partitioned among a group of zones 201-205 in an illustrative embodiment. In this embodiment, pool 302 includes forty individual transmission slots 304 in the time domain for one or more frames, although pool 302 may include more or less transmission slots 304 in other embodiments. The transmission slots 304 in pool 302 are each assigned to one of the zones 201-205. For example, the transmission slots 304 labeled "A" may be assigned to zone 201, the transmission slots 304 labeled "B" may be assigned to zone 202, etc. The assignment of the transmission slots 304 forms subsets 311-315 of transmission slots 304 for zones 201-205 as shown in FIG. 3, and there are L transmission slots per subset 311-315 (L=T/K). The subsets 311-315 are independent or distinct, meaning that the transmission slots 304 in one subset are orthogonal to transmission slots in other subsets.

This assignment of transmission slots 304 helps avoid collisions on the air interface in neighboring zones. For example, if vehicles in zone 201 only transmit on transmission slots 304 labeled "A" and vehicles in zone 202 only transmit on transmission slots 304 labeled "B", then transmissions in these neighboring zones will not collide. After a certain distance of separation, zones 201-205 may repeat and the transmission slots 304 may be reused. In FIG. 2 for instance, zone 201 may repeat to the right of zone 205 as the distance between consecutive zones 201 using the same transmission slots 304 is sufficient to avoid collision.

Figure 4:
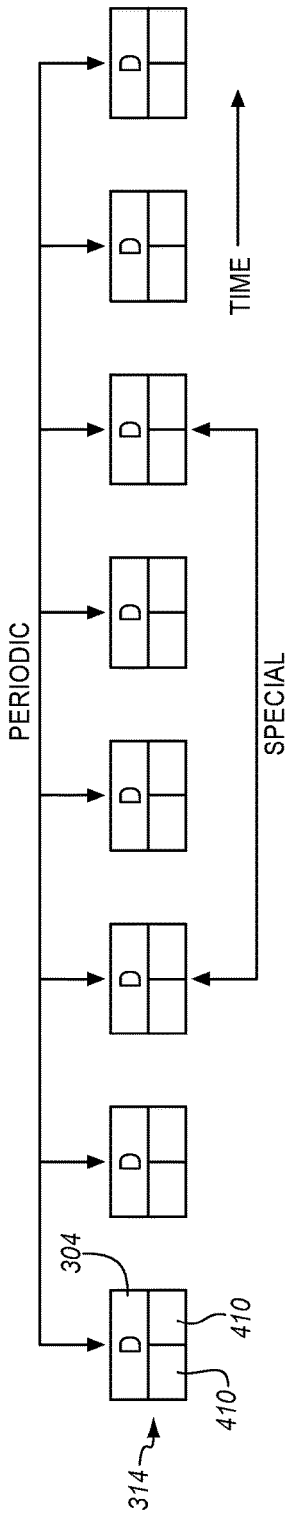
FIG. 4 illustrates transmission slots for a zone partitioned according to a transmission type in an illustrative embodiment.

Within a zone 204, a subset 314 of transmission slots 304 may be further partitioned according to transmission or message type. FIG. 4 illustrates transmission slots 304 for a zone 204 partitioned according to a transmission type in an illustrative embodiment. As described above, vehicles in zone 204 may transmit a periodic transmission or a special transmission. The transmission slots 304 for a subset 314 assigned to a zone 204 may be further allocated for periodic transmissions or special transmissions. Thus, a number (M) of transmission slots 304 in subset 314 is designated for periodic transmissions, and a number (N) of transmission slots 304 in subset 314 is reserved for special transmissions. In one embodiment, the number M of transmission slots 304 designated for periodic transmissions is greater than the number N of transmission slots 304 reserved for special transmissions. In one embodiment, the transmission slots 304 reserved for special transmissions may be evenly spaced among the transmission slots 304 designated for periodic transmissions.

Also illustrated in FIG. 4 is that each transmission slot 304 may be comprised of half slots 410. A half slot 410 may represent the smallest modulation structure for a vehicle. Thus, a vehicle may encode data on a "full" transmission slot 304 or a half slot 410.

Figure 5:
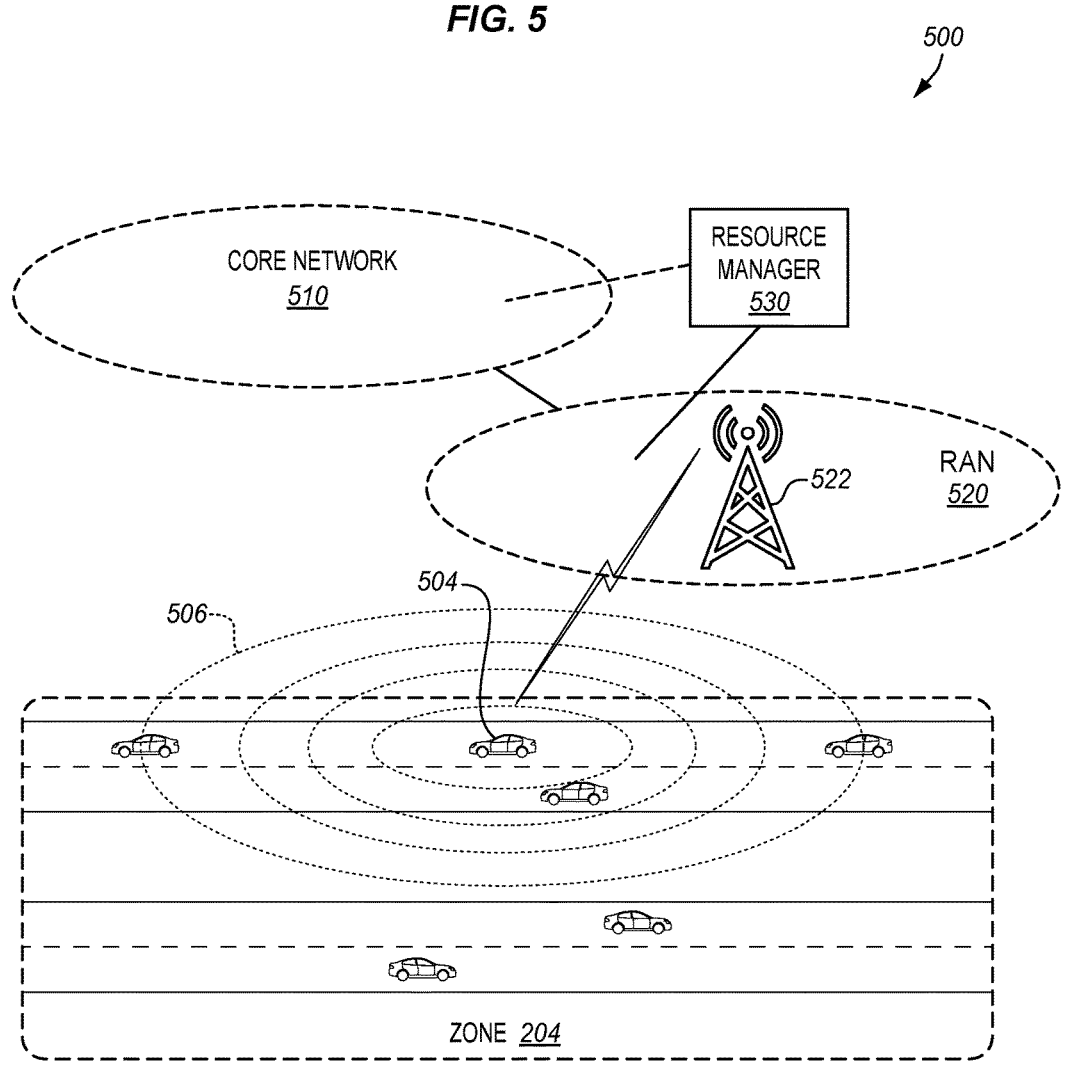
FIG. 5 is a system implementing V2V communications in an illustrative embodiment.

FIG. 5 is a system 500 implementing V2V communications in an illustrative embodiment. FIG. 5 shows a plurality of vehicles traveling in zone 204. These vehicles are configured to "talk" with one another via V2V communications. The V2V communications are indicated by vehicle 504 transmitting or broadcasting one or more wireless signals 506 encoded with data or information to other vehicles in zone 204. Although not visible in FIG. 5, vehicle 504 includes a V2V communication device configured to transmit and receive wireless signals for V2V communications.

System 500 may further include a mobile network or at least a portion of a mobile network. A mobile network, which may also be referred to as a cellular network, is a type of communication network where the last link to end user devices is wireless. A mobile network as described herein may represent a next generation network (e.g., a 5G network), a Long-Term Evolution (LTE) network or another 4G network, etc. A mobile network may include a core network 510 and a Radio Access Network (RAN) 520. Core network 510 is the central part of a mobile network that provides various services to subscribers who connect to core network 510 via RAN 520. RAN 520 is a network that implements a radio access technology to connect mobile devices to core network 510, such as V2V communication devices installed in vehicles for V2V communications. RAN 520 may support Evolved-UMTS Terrestrial Radio Access Network (E-UTRAN) access, Wireless Local Area Network (WLAN) access, fixed access, satellite radio access, new Radio Access Technologies (RAT), etc. RAN 520 may include one or more base stations 522, such as an Evolved-NodeB (eNodeB). A base station 522 is an access network element/node in RAN 520 that handles radio communications with mobile devices using antennas typically mounted on a tower. Base station 522 has a service area that is referred to as a cell. Mobile devices or User Equipment (UE) that are located within the cell are able to communicate with base station 522 over the air interface, which is the communication link between a mobile device and a base station. The mobile devices may communicate with base station 522 via the LTE Uu interface, which is the air interface between a mobile device and an eNodeB, or via another interface (e.g., a next generation interface).

System 500 may further include a resource manager 530 that is configured to manage the radio resources used for V2V communications. In one embodiment, resource manager 530 may be implemented in RAN 520. For instance, resource manager 530 may be implemented at base station 522 of RAN 520, or may be implemented in an external server deployed between base station 522 and core network 510. One example of resource manager 530 may be a Mobile Edge Computing (MEC) server implemented in RAN 520 that enables Information Technology (IT) services and cloud computing services at the edge of a mobile network (i.e., within RAN 520) and in close proximity to vehicles performing V2V communications. The MEC server may host, execute, or run one or more edge applications to manage the V2V communications. In another embodiment, resource manager 530 may be implemented in core network 510.

As described in more detail below, resource manager 530 is configured to determine when vehicles enter zones 201-205. As a vehicle enters a zone, resource manager 530 performs a slot assignment where it attempts to assign a periodic transmission slot to the vehicle from the subset of transmission slots allocated to that zone. Resource manager 530 is further configured to transmit (e.g., broadcast) the slot assignments for the periodic transmissions slots to the vehicles. Thus, each vehicle may know its individual slot assignment based on the information broadcast by resource manager 530. Each vehicle may also know slots assignments for other vehicles and/or unassigned transmission slots (or half slots) based on the information broadcast by resource manager 530. Resource manager 530 may also broadcast information on the special transmission slots for the zones so each vehicle is informed of the special transmission slots.

Figure 6:
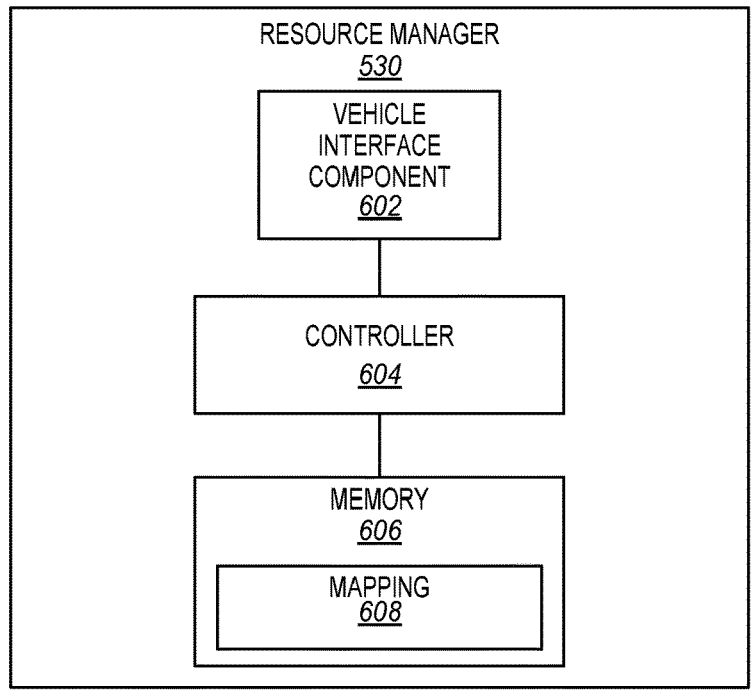
FIG. 6 is a block diagram of a resource manager in an illustrative embodiment.

FIG. 6 is a block diagram of resource manager 530 in an illustrative embodiment. Resource manager 530 includes a vehicle interface component 602, a controller 604, and a memory 606. Vehicle interface component 602 represents circuitry, logic, hardware (e.g., a processor or processors), software, means, etc., that communicates with vehicles, or more particularly, with V2V communication devices installed in vehicles. Vehicle interface component 602 may use a base station, an access point, etc., to exchange wireless communications with the V2V communication devices. Controller 604 represents circuitry, logic, hardware, software, means, etc., that provides the functions of resource manager 530. As one of the functions, controller 604 is configured to assign radio resources (i.e., transmission slots) to vehicles located within zones 201-205. Memory 606 is a storage unit for data, instructions, applications, etc., and is accessible by controller 604 and/or other devices. Resource manager 530 may include various other components not specifically illustrated in FIG. 6.

Figure 7:
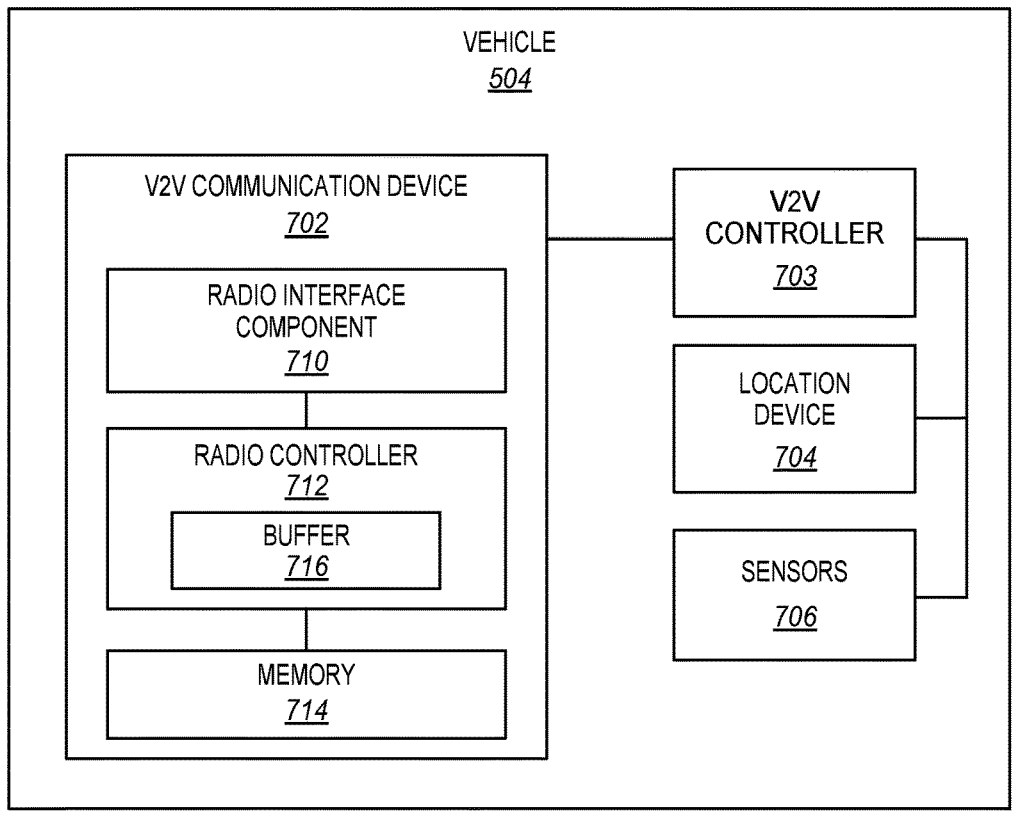
FIG. 7 is a block diagram of a vehicle in an illustrative embodiment.

FIG. 7 is a block diagram of a vehicle 504 in an illustrative embodiment. In this embodiment, vehicle 504 includes a V2V communication device 702, a V2V controller 703, a location device 704, and sensors 706. V2V communication device 702 represents circuitry, logic, hardware, software, means, etc., configured to exchange wireless signals for V2V communications. V2V controller 703 represents circuitry, logic, hardware, software, means, etc., configured to generate V2V transmissions for other vehicles and/or process V2V transmissions received from other vehicles. Location device 704 represents circuitry, logic, hardware, software, means, etc., configured to determine location information for vehicle 504. For example, location device 704 may include a Global Positioning System (GPS) configured to receive geolocation information for vehicle 504 from one or more satellites. Sensors 706 represent circuitry, logic, hardware, software, means, etc., configured to detect or acquire operating parameters or other data for vehicle 504. For example, sensors 706 may include a speed sensor configured to determine a speed or velocity of vehicle 504. Sensors 706 may include radar sensors, sonar or ultrasonic sensors, LiDAR sensors, etc., positioned at the front, rear, and/or sides of vehicle 504 to detect objects, such as other vehicles. Sensors 706 may include a steering wheel sensor configured to determine an steering angle of a steering wheel. Vehicle 504 may include various other components not specifically illustrated in FIG. 7.

V2V communication device 702 includes a radio interface component 710, a radio controller 712, and a memory 714. Radio interface component 710 comprises circuitry, logic, hardware, software, means, etc., configured to communicate with other vehicles via wireless or RF signals on an RF spectrum. Radio interface component 710 may also communicate with a RAN, access points, etc. Radio interface component 710 may include one or more radio transceivers and one or more antennas that enable wireless communication on the licensed spectrum and/or the unlicensed spectrum, and using a variety of protocols. Radio controller 712 represents circuitry, logic, hardware, software, means, etc., that provides the functions of V2V communication device 702, such as encoding or modulating data on a transmission slot or half slot, and/or decoding or demodulating data from a transmission slot or half slot. Memory 714 is a computer readable storage medium for data, instructions, applications, etc., and is accessible by radio controller 712.

Figure 8:
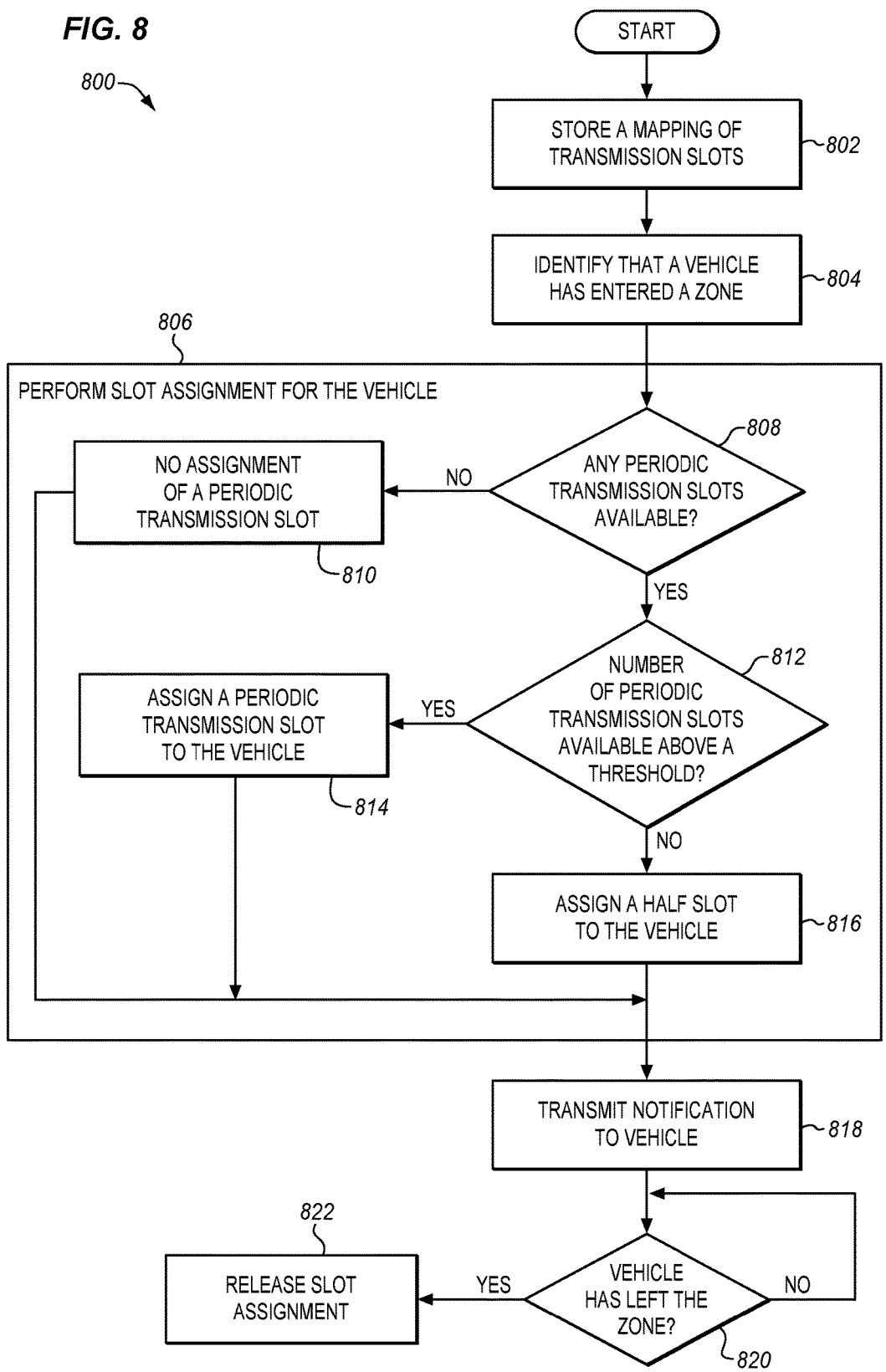
FIG. 8 is a flow chart illustrating a method of managing radio resources for V2V communications in an illustrative embodiment.

FIG. 8 is a flow chart illustrating a method 800 of managing radio resources for V2V communications in an illustrative embodiment. The steps of method 800 will be described with reference to resource manager 530 in FIGS. 5-6, but those skilled in the art will appreciate that method 800 may be performed in other devices. Also, the steps of the flow charts described herein are not all inclusive and may include other steps not shown, and the steps may be performed in an alternative order.

Resource manager 530 is tasked with managing radio resources for V2V communications in one or more zones 201-205. Thus, controller 604 of resource manager 530 stores a mapping 608 in memory 606 of transmission slots 304 on the RF spectrum for V2V communications in a geographic area (step 802). As described above, the geographic area is segmented into a plurality of zones 201-205 with a subset of the transmission slots 304 allocated to each of the zones 201-205. Thus, mapping 608 may indicate the subset of transmission slots 304 for each of zones 201-205, or for multiple groups (K) of zones 201-205 within the geographic area. The mapping 608 may also indicate, for each of the subsets of transmission slots 304, an allocation of periodic transmission slots and an allocation of special transmission slots. The mapping 608 may take on any desired form in this embodiment. For example, the mapping 608 may be a list of (T) transmission slots 304 allocated for each zone 201-205, with each of the transmission slots 304 labeled as reserved for a special transmission or labeled as designated for a periodic transmission. The special transmission slots are not allocated to any particular vehicle but are shared and may be accessed by vehicles in the zone via a contention-based protocol. The periodic transmission slots (or half slot) are allocated to individual vehicles by resource manager 530 for so long as a vehicle is located in a zone, or at least to allow a vehicle to transmit a periodic transmission. Mapping 608 may therefore further indicate the assignment of periodic transmission slots to individual vehicles.

Controller 604 identifies that a vehicle 504 has entered one of the zones 201-205 managed by resource manager 530 (step 804). Controller 604 stores information on zones 201-205 in which it manages, and may monitor for vehicles that enter the zones 201-205. Controller 604 may broadcast information (e.g., GPS coordinates) specifying boundaries of zones 201-205. To detect a vehicle 504 entering a zone, controller 604 may receive a message or signaling from the vehicle 504 through vehicle interface component 602 indicating its location or indicating that it has entered a particular zone. The message or signaling from vehicle 504 may therefore include location information (e.g., GPS coordinates), a zone identifier, a request for a slot assignment, such as for a particular zone, etc. Controller 604 may also query or receive updates from a location database in core network 510 indicating the location of vehicle 504 (see FIG. 5).

In response to vehicle 504 entering a zone 201-205, controller 604 performs a slot assignment for the vehicle 504 from the periodic transmission slots 304 allocated to the zone (step 806). As described below, a slot assignment for a vehicle may comprise assignment of a (full) periodic transmission slot, assignment of a half slot, or no assignment of a periodic transmission slot (full slot or half slot). As part of the slot assignment, controller 604 may determine whether any periodic transmission slots are available (step 808). When no periodic transmission slots are available (i.e., neither a full slot nor a half slot), controller 604 does not assign a periodic transmission slot to vehicle 504 or assigns a null value to vehicle 504 (step 810). A null value provides an indication for vehicle 504 to select a periodic transmission slot at random for a periodic transmission instead of using a specifically-assigned slot.

When one or more periodic transmission slots are available, controller 604 may determine whether the number of periodic transmission slots available is above a threshold (Q) (step 812). When the number of periodic transmission slots available is above the threshold, controller 604 may assign a periodic transmission slot (i.e., a full transmission slot) to vehicle 504 (step 814). This periodic transmission slot therefore becomes an allocated periodic transmission slot, which is assigned solely to vehicle 504 in this instance. When the number of periodic transmission slots available is not above the threshold, controller 604 may assign a half slot to vehicle 504 (step 816). When assigning a half slot, controller 604 may first search for a half slot of a periodic transmission slot where the other half slot of the same periodic transmission slot is already allocated or assigned to another vehicle. When there are no half slots available where the other half slot is already assigned to another vehicle, controller 604 may assign a half slot to vehicle 504 from an "unallocated" periodic transmission slot which refers to a transmission slot where none of the transmission slot has been allocated or assigned to an individual vehicle. Thus, controller 604 will assign a half slot of a periodic transmission slot to vehicle 504, and will leave the other half slot of the same periodic transmission slot available for other vehicles.

After assignment of a null value, a full periodic transmission slot, or a half slot, controller 604 transmits a notification to vehicle 504 (or more particularly, to V2V communication device 702) indicating the slot assignment for vehicle 504 (step 818). In one embodiment, the notification may comprise a message or signaling directed to V2V communication device 702 through vehicle interface component 602 and base station 522. The message or signaling may indicate the periodic transmission slot assigned to vehicle 504, the half slot, or a null value. In another embodiment, controller 604 may broadcast mapping 608 to vehicles located within an area, such as with base station 522, indicating the slot assignment for vehicle 504 and the slot assignments of other vehicles (if any). Mapping 608 may therefore advertise available transmission slots that a vehicle may request. The notification may also indicate the special transmission slots allocated to one or more of the zones 201-205. Based on the broadcasted information, each vehicle in a zone may be able to identify its assigned periodic transmission slot or half slot (if any), the periodic transmission slots or half slots assigned to other vehicles (if any), and the special transmission slots allocated for that zone.

Controller 604 also identifies when vehicle 504 has left the zone (step 820). For example, controller 604 may receive a message or signaling from vehicle 504 reporting that it has left the zone, may receive a message or signaling from vehicle 504 reporting location information which controller 604 may use to detect when vehicle 504 leaves the zone, etc. When vehicle 504 leaves the zone, controller 604 releases the slot assignment (i.e., the periodic transmission slot or half slot) for vehicle 504 (step 822) so that the periodic transmission slot or half slot is available for another vehicle already in the zone or that travels into the zone. Thus, the radio resources are reused as vehicles travel in and out of zones.

Figure 9:
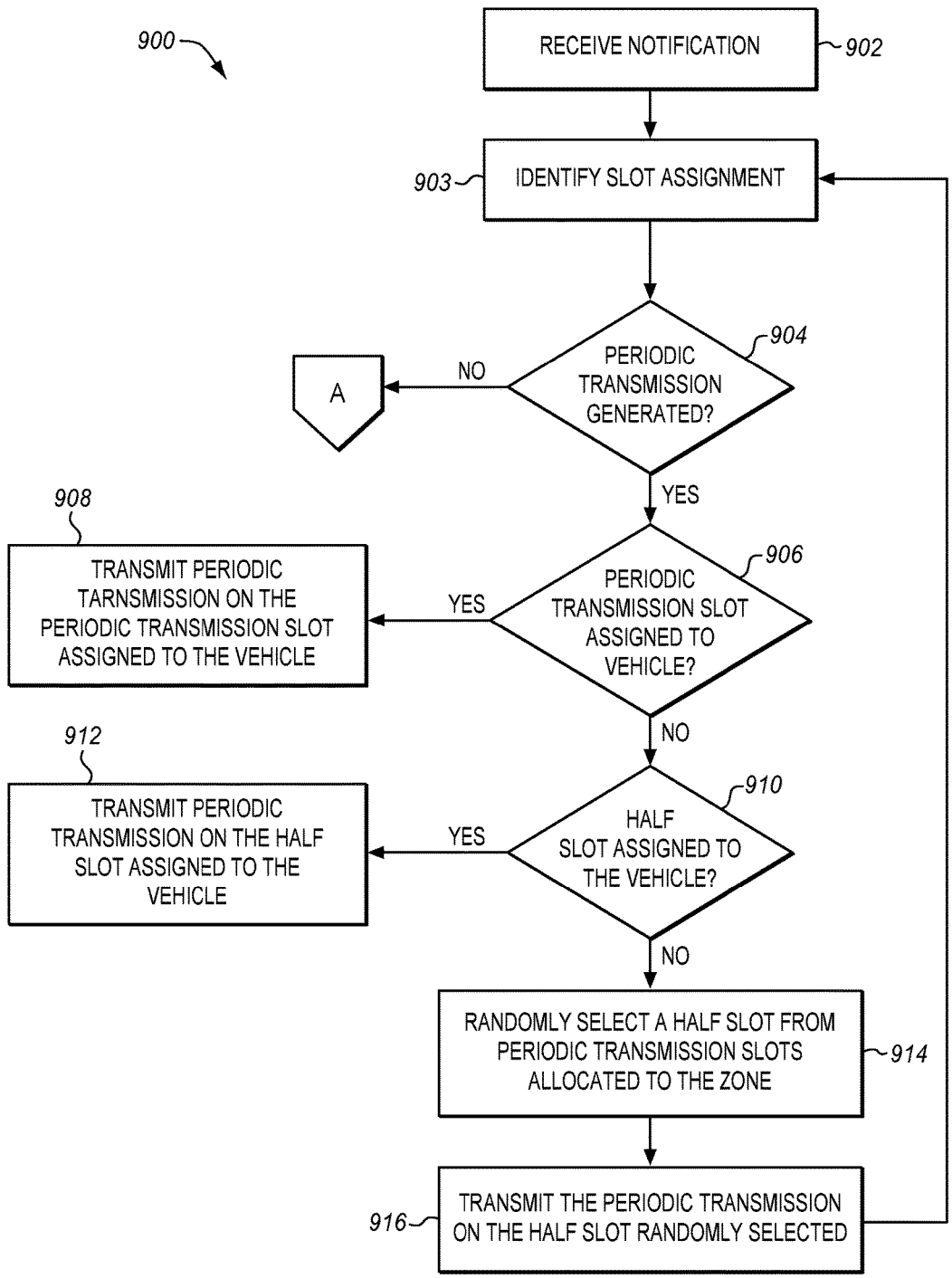
FIGS. 9-10 are flow charts illustrating a method of using radio resources for V2V communications in an illustrative embodiment.
Figure 10:
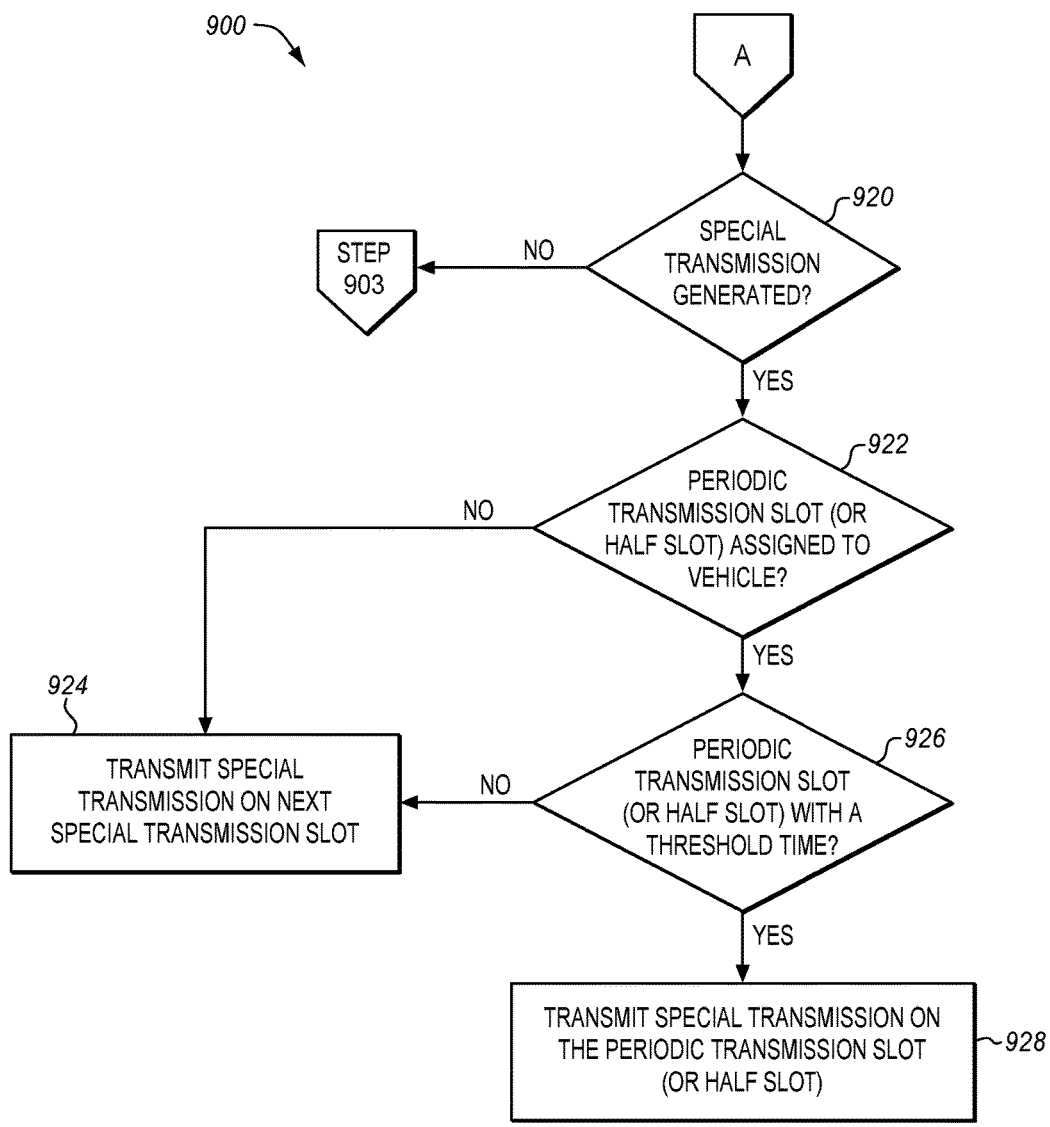

FIGS. 9-10 are flow charts illustrating a method 900 of using radio resources for V2V communications in an illustrative embodiment. The steps of method 900 will be described with reference to vehicle 504 in FIG. 7, but those skilled in the art will appreciate that method 900 may be performed in other devices.

At some point when vehicle 504 enters a zone, radio controller 712 receives a notification from resource manager 530 through radio interface component 710 indicating a slot assignment for vehicle 504 (step 902). The notification may be directed to vehicle 504 or may be a broadcast message received by vehicle 504. Radio controller 712 processes the notification to identify a slot assignment for vehicle 504 (step 903). The notification may indicate that vehicle 504 has been assigned a periodic transmission slot, a half slot, or no periodic transmission slot (i.e., a null value). The notification from resource manager 530 may be in response to a message or signaling from radio controller 712 reporting location information, reporting that vehicle 504 has entered a zone, requesting the notification, etc.

V2V controller 703 is programmed to send periodic transmissions to other vehicles located in zone 204. For instance, V2V controller 703 may be programmed to send a periodic transmission indicating location information determined from location device 704, speed or velocity determined from sensors 706, steering wheel angle determined from sensors 706, or other data. V2V controller 703 may also be programmed to send special transmissions to other vehicles located in zone 204. For instance, V2V controller 703 may be programmed to trigger a special transmission in response to detecting an obstacle based on output from sensors 706, detecting an emergency, etc. Thus, V2V controller 703 may generate a periodic transmission or a special transmission that is queued in a transmit buffer 716.

V2V communication device 702 monitors for transmissions generated by V2V controller 703 in order to broadcast or otherwise send the transmissions. Thus, radio controller 712 determines whether a periodic transmission has been generated (step 904). For example, radio controller 712 may parse transmit buffer 716 to determine whether V2V controller 703 has generated a periodic transmission. In response to identifying a periodic transmission, radio controller 712 determines whether a periodic transmission slot (i.e., a full slot) has been assigned to vehicle 504 in the slot assignment (step 906). When a periodic transmission slot has been assigned to vehicle 504, radio controller 712 transmits the periodic transmission on the periodic transmission slot assigned to vehicle 504 via radio interface component 710 (step 908). For instance, radio interface component 710 may be configured to encode data on the periodic transmission slot using a Modulation and Coding Scheme (MCS).

When a full periodic transmission slot has not been assigned to vehicle 504, radio controller 712 determines whether a half slot of a periodic transmission slot has been assigned to vehicle 504 in the slot assignment (step 910). When a half slot has been assigned to vehicle 504, radio controller 712 transmits the periodic transmission on the half slot that was assigned to vehicle 504 via radio interface component 710 (step 912). For instance, radio interface component 710 may be configured to encode data on the half slot using an MCS that is lower than the MCS used to encode data on a full periodic transmission slot. When a half slot has not been assigned to vehicle 504, radio controller 712 does not have a specific slot assignment for the periodic transmission. Thus, radio controller 712 randomly selects a half slot from one of the periodic transmission slots allocated to zone 204 (step 914), and transmits the periodic transmission on the half slot randomly selected via radio interface component 710 (step 916).

As shown in FIG. 10, radio controller 712 may additionally or alternatively determine whether a special transmission has been generated (step 920). For example, radio controller 712 may parse transmit buffer 716 to determine whether V2V controller 703 has generated a special transmission. In response to identifying a special transmission, radio controller 712 determines whether a periodic transmission slot (or a half slot) has been assigned to vehicle 504 in the slot assignment (step 922). When a periodic transmission slot (or a half slot) has not been assigned to vehicle 504, radio controller 712 transmits the special transmission on a next special transmission slot via radio interface component 710 (step 924). Access to a special transmission slot is contention-based, so radio controller 712 and/or radio interface component 710 uses a contention-based protocol or scheme to gain access to the special transmission slot. In one embodiment, radio controller 712 may randomly select a half slot from the next special transmission slot, and transmit the special transmission on the half slot that was randomly selected.

When a periodic transmission slot (or a half slot) has been assigned to vehicle 504, radio controller 712 determines whether the periodic transmission slot (or a half slot) is within a threshold time (i.e., within D milliseconds) (step 926). When the periodic transmission slot (or half slot) is not within the threshold time, radio controller 712 transmits the special transmission on a next special transmission slot via radio interface component 710 (step 924). When the periodic transmission slot (or half slot) is within the threshold time, radio controller 712 transmits the special transmission on the periodic transmission slot (or half slot) via radio interface component 710 (step 928). If there is a periodic transmission in transmit buffer 716 waiting to be sent on this periodic transmission slot (or half slot) that is now being used for a special transmission, then radio controller 712 may discard the periodic transmission as the special transmission has a higher priority.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof

What is claimed is:

1. A resource manager comprising:
a memory configured to store a mapping of transmission slots on a Radio Frequency (RF) spectrum for vehicle-to-vehicle (V2V) communications in a geographic area, wherein the geographic area is segmented into a plurality of zones with a subset of the transmission slots allocated to each of the zones, and wherein the subset of the transmission slots allocated to each of the zones is partitioned into periodic transmission slots assignable to individual vehicles for periodic transmissions and special transmission slots reserved for special transmissions according to a contention-based protocol; and
a controller configured to identify that a vehicle entered one of the zones, to perform a slot assignment for the vehicle from the periodic transmission slots allocated to the one of the zones, and to transmit a notification through a vehicle interface component to the vehicle indicating the slot assignment.

2. The resource manager of claim 1 wherein:
the controller is configured to determine whether any of the periodic transmission slots allocated to the one of the zones are available, and to not assign a periodic transmission slot to the vehicle when none of the periodic transmission slots allocated to the one of the zones are available.

3. The resource manager of claim 2 wherein:
when at least one of the periodic transmission slots allocated to the one of the zones is available, the controller is configured to determine whether a number of the available periodic transmission slots allocated to the one of the zones is above a threshold; and
when the number is above the threshold, the controller is configured to assign one of the available periodic transmission slots to the vehicle.

4. The resource manager of claim 3 wherein:
when the number is not above the threshold, the controller is configured to assign a half slot of one of the available periodic transmission slots to the vehicle.

5. The resource manager of claim 1 wherein:
the special transmission slots for each of the zones are spaced evenly among the periodic transmission slots.

6. The resource manager of claim 1 wherein:
the controller is configured to release the slot assignment for the vehicle when the vehicle leaves the one of the zones.

7. The resource manager of claim 1 wherein:
the notification indicates the special transmission slots allocated to the one of the zones.

8. A method of managing radio resources for vehicle-to-vehicle (V2V) communications, the method comprising:
storing a mapping of transmission slots on a Radio Frequency (RF) spectrum for the V2V communications in a geographic area, wherein the geographic area is segmented into a plurality of zones with a subset of the transmission slots allocated to each of the zones, and wherein the subset of the transmission slots allocated to each of the zones is partitioned into periodic transmission slots assignable to individual vehicles for periodic transmissions and special transmission slots reserved for special transmissions according to a contention-based protocol;
identifying that a vehicle entered one of the zones;
performing a slot assignment for the vehicle from the periodic transmission slots allocated to the one of the zones; and
transmitting a notification to the vehicle indicating the slot assignment.

9. The method of claim 8 wherein performing the slot assignment for the vehicle comprises:
determining whether any of the periodic transmission slots allocated to the one of the zones are available; and
not assigning a periodic transmission slot to the vehicle when none of the periodic transmission slots allocated to the one of the zones are available.

10. The method of claim 9 wherein performing the slot assignment for the vehicle comprises:

when at least one of the periodic transmission slots allocated to the one of the zones is available, determining whether a number of the available periodic transmission slots allocated to the one of the zones is above a threshold; and when the number is above the threshold, assigning one of the available periodic transmission slots to the vehicle.

11. The method of claim 10 wherein performing the slot assignment for the vehicle comprises:

when the number is not above the threshold, assigning a half slot of one of the available periodic transmission slots to the vehicle.

12. The method of claim 8 wherein:

the special transmission slots for each of the zones are spaced evenly among the periodic transmission slots.

13. The method of claim 8 further comprising:

releasing the slot assignment for the vehicle when the vehicle leaves the one of the zones.

14. The method of claim 8 wherein:

the notification indicates the special transmission slots allocated to the one of the zones.

15. A non-transitory computer readable medium embodying programmed instructions executed by one or more processors, wherein the instructions direct the processors to implement a method comprising:

storing a mapping of transmission slots on a Radio Frequency (RF) spectrum for vehicle-to-vehicle (V2V) communications in a geographic area, wherein the geographic area is segmented into a plurality of zones with a subset of the transmission slots allocated to each of the zones, and wherein the subset of the transmission slots allocated to each of the zones is partitioned into periodic transmission slots assignable to individual vehicles for periodic transmissions and special transmission slots reserved for special transmissions according to a contention-based protocol;

identifying that a vehicle entered one of the zones;

performing a slot assignment for the vehicle from the periodic transmission slots allocated to the one of the zones; and transmitting a notification to the vehicle indicating the slot assignment.

16. The non-transitory computer readable medium of claim 15 wherein performing the slot assignment for the vehicle comprises:

determining whether any of the periodic transmission slots allocated to the one of the zones are available; and not assigning a periodic transmission slot to the vehicle when none of the periodic transmission slots allocated to the one of the zones are available.

17. The non-transitory computer readable medium of claim 16 wherein performing the slot assignment for the vehicle comprises:

when at least one of the periodic transmission slots allocated to the one of the zones is available, determining whether a number of the available periodic transmission slots allocated to the one of the zones is above a threshold; and when the number is above the threshold, assigning one of the available periodic transmission slots to the vehicle.

18. The non-transitory computer readable medium of claim 17 wherein performing the slot assignment for the vehicle comprises:

when the number is not above the threshold, assigning a half slot of one of the available periodic transmission slots to the vehicle.

19. The non-transitory computer readable medium of claim 15 wherein:

the special transmission slots for each of the zones are spaced evenly among the periodic transmission slots.

20. The non-transitory computer readable medium of claim 15 wherein the method further comprises:

releasing the slot assignment for the vehicle when the vehicle leaves the one of the zones.

* * * * *